(12) United States Patent
Buchhold et al.

(10) Patent No.: US 8,060,276 B2
(45) Date of Patent: Nov. 15, 2011

(54) METHOD FOR OPERATING A MOTOR VEHICLE

(75) Inventors: Oliver Buchhold, Deggenhausertal (DE); Wilhelm Moser, Pfullendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 340 days.

(21) Appl. No.: 12/447,700

(22) PCT Filed: Oct. 12, 2007

(86) PCT No.: PCT/EP2007/060886
§ 371 (c)(1),
(2), (4) Date: Apr. 29, 2009

(87) PCT Pub. No.: WO2008/052871
PCT Pub. Date: May 8, 2008

(65) Prior Publication Data
US 2010/0076645 A1    Mar. 25, 2010

(30) Foreign Application Priority Data
Nov. 4, 2006  (DE) .......................... 10 2006 052 102

(51) Int. Cl.
*G01M 17/00* (2006.01)
(52) U.S. Cl. ....................................................... 701/34
(58) Field of Classification Search .................... 701/34, 701/54, 93, 96; 180/233, 247, 197; 477/110, 477/111, 34
See application file for complete search history.

(56) References Cited

U.S. PATENT DOCUMENTS

| 6,516,255 | B2 | 2/2003 | Jager et al. |
| 6,834,217 | B2 | 12/2004 | Erban |
| 7,860,629 | B2 * | 12/2010 | Schweizer et al. .............. 701/51 |

FOREIGN PATENT DOCUMENTS

| DE | 39 22 490 A1 | 3/1990 |
| DE | 198 19 780 A1 | 11/1998 |
| DE | 198 23 762 A1 | 12/1998 |
| DE | 198 27 117 A1 | 12/1999 |
| DE | 199 58 075 A1 | 6/2000 |
| DE | 199 47 025 A1 | 3/2001 |
| DE | 100 61 502 A1 | 6/2001 |
| DE | 10 2004 036 098 A1 | 2/2006 |
| GB | 2 327 995 B | 6/2002 |
| GB | 2 329 443 B | 7/2002 |
| JP | 83 18836 A | 12/1996 |
| WO | 98/13620 A1 | 4/1998 |

* cited by examiner

*Primary Examiner* — Faye M. Fleming
(74) *Attorney, Agent, or Firm* — Davis & Bujold, P.L.L.C.

(57) ABSTRACT

A method for operating a motor vehicle with an automated gearbox (1), which can be connected, via a clutch (2), to a prime mover (3). The output rotational speed of the gearbox (1) is detected by sensors and evaluated for plausibility by comparison with an arithmetic mean value of sensor-detected rotational speeds of the rear wheels (7, 8) of the motor vehicle. It is also possible to determine plausibility, using the arithmetic mean of the sensor-detected rotational speeds of the front wheels (9, 10), in case of a failure of at least one of both generated signals (20, 21) of the rotational speed sensors (18, 19) of the rear wheels (7, 8) for checking the plausibility of the output rotational speed of the gearbox (1).

5 Claims, 2 Drawing Sheets

METHOD FOR OPERATING A MOTOR VEHICLE

This application is a National Stage completion of PCT/EP2007/060886 filed Oct. 12, 2007, which claims priority from German patent application serial no. 10 2006 052 102.1 filed Nov. 4, 2006.

FIELD OF THE INVENTION

The present invention relates to a method for operating a motor vehicle.

BACKGROUND OF THE INVENTION

An automatic clutch between the motor and drive train of a motor vehicle with a gearbox, which is arranged on the output side of the clutch, and can be shifted by the driver, is known from WO 98/13620. A positioning unit used for engaging and disengaging the clutch is controlled by sensors taking preset values into account, whereby the sensors have signal generators for the respectively engaged rotational speed and/or the respectively engaged gear as well as signal generators for rotational speed detection arranged on the input side and output side of the clutch, and whereby the engaging and disengaging of the clutch are controlled as a function of the rotational speed differences between the clutch input and output. In the event that the signals of the signal generators are no longer available for the rotational speed on the output side, replacement signals will be calculated using other values. In particular, it is proposed that the clutch output rotational speed is determined on the basis of a gearbox output rotational speed that has remained the same since the last phase of the previous engaged state of the clutch and taking into account the respectively engaged rotational speed.

It is further known that knowing the gearbox output rotational speed is especially important in the control of automated gearboxes. Therefore, an ascertained rotational speed signal of a rotational speed sensor at the gearbox output shaft is usually compared, with regard to its plausibility, with the wheel rotational speed signals of sensors at the rear wheels of the motor vehicle, whereby these wheel rotational speed signals are also available for controlling an anti-lock braking system or an anti-slip regulating system (ABS/ASR system). By means of such plausibility checking of the determined rotational speed values of the transmission output shaft, the following malfunctions should especially be prevented:

a) the measured gearbox output rotational speed is equal to zero and therefore indicates that the motor vehicle is standing still, while it is actually moving. In this operating situation, automatic shifting of the first gear as a start-up gear can result in the destruction of the clutch by an inadmissibly high rotational speed of the gearbox input shaft.

b) the measured gearbox output rotational speed is greater than zero, and therefore indicates a vehicle rotational speed, while the vehicle is actually standing still. This circumstance can lead to an erroneous detection of the vehicle motion, and thus to automatic engagement of the clutch, so that the vehicle is unintentionally started because the automated clutch is engaged according to known control methods during motion, even without the deflection of the accelerator pedal in order to use the braking effect of the prime mover.

Rendering the ascertained rotational speed signals usually takes place such that an arithmetic mean value of sensor-detected rotational speeds of both rear wheels of the motor vehicle is formed. The rear differential ratio is taken into account, and the calculated input rotational speed of the rear axle gearbox thus ascertained is compared to the sensor-detected gearbox input rotational speed. The arithmetic mean of the rotational speed signals of both rotational speed sensors at the rear wheels is used for averaging the rotational speed differences between both rear wheels that are to be balanced by the differential gear while cornering.

With this intrinsically advantageous plausibility check of the rotational speed it cannot, however, be ruled out that the signal transmission of at least one rotational speed sensor at the rear wheels may fail due to damage to the rotational speed sensor itself, or due to failures in the signaling lines and/or their electric contacts. As a result of such false report, which is detrimental to further operation of the motor vehicle, for example start-up shifting of the gearbox during motion is prevented subject to the current operating state, or the gearbox is shifted into neutral while the vehicle is standing still, as a result of which the vehicle can no longer be started up. Both known control reactions limit and/or prevent operation of the vehicle.

SUMMARY OF THE INVENTION

Against this background, it is the object of the present invention to propose an improved plausibility strategy which allows further operation of the motor vehicle and/or does not restrict, or only minimally restricts the drivability of the motor vehicle in case of a failure of at least one of both signals of the rotational speed sensors at the rear wheels due a defect in the sensors as such, or due to a failure in the signaling line and/or its contacts.

Accordingly, the present invention relates to a method for operating a motor vehicle having an automated gearbox, which can be connected to a prime mover via a clutch, the gearbox output rotational speed being detected by means of sensors and rendered plausible by comparison with an arithmetic mean value of sensor-detected rotational speeds of the rear wheels of the motor vehicle. In addition, in order to attain the object, it is provided that in case of a failure of at least one of generated signals of the rotational speed sensors of the rear wheels, the arithmetic mean of sensor-detected rotational speeds of the front wheels are used for rendering the gearbox output rotational speed plausible.

According to a first advantageous further development of the method, gearbox shifting is prevented when significant differences between the arithmetic mean value of the rotational speeds of the front wheels and the gearbox output rotational speed are detected. In particular, gearbox shifting is prevented when the output rotational speed indicates that the motor vehicle is standing still, while the motor vehicle is moving.

It is further provided that gearbox shifting is allowed when the arithmetic mean of the rotational speeds of the front wheels and the gearbox output rotational speed agree without significant deviations.

According to a second advantageous embodiment of the method, it is provided that the clutch is prevented from engaging when significant differences are detected between the arithmetic mean value of the rotational speeds of the front wheels and the gearbox output rotational speed with the accelerator pedal in a position below a previously defined reading-related deflection threshold of the accelerator pedal deflection path.

The clutch is for example prevented from engaging when the gearbox output rotational speed indicates a motor vehicle speed, while it is actually standing still.

Besides, it can be provided that engaging the clutch is allowed when the arithmetic mean of the rotational speeds of the front wheels agree with the gearbox output rotational speed without significant differences.

In order to define the expression significant difference between the arithmetic mean of the rotational speeds of the front wheels and the gearbox output rotational speed, a maximum rotational speed deviation between 5% and 10% is specified in the present description. The measured value-related deflection threshold of the accelerator pedal above which, according to the described method, the clutch may be engaged, is defined in this description between 5% and 10% of the maximum travel distance of the accelerator pedal.

BRIEF DESCRIPTION OF THE DRAWINGS

Drawings are attached to the description for the purpose of clarification of the present invention, wherein.

DETAILED DESCRIPTION OF THE PREFERRED EMBODIMENTS

Figure 1:
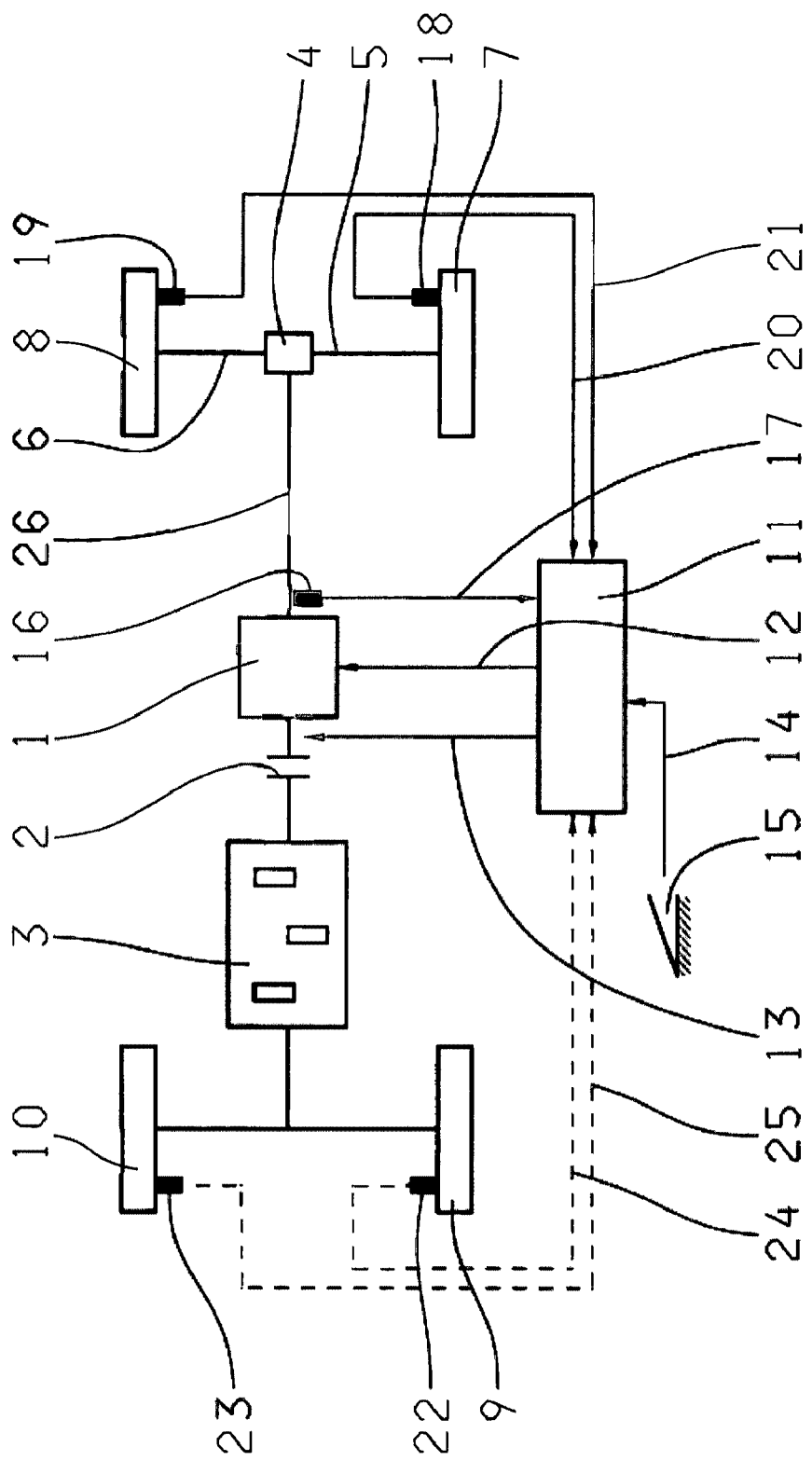
FIG. 1 shows a drive train of a motor vehicle with an automated gearbox, which can be connected to a prime mover.

Accordingly, FIG. 1 schematically shows an inherently known motor vehicle drive train with a rear axle drive and an automated gearbox 1, which can be connected to a prime mover 3, an internal combustion engine in the present description, via a clutch 2. The gearbox 1 is drive-coupled to a differential gear 4 via its output shaft and a cardan shaft 26, and drives the rear wheels 7, 8 via two axle shafts 5, 6. Both front wheels 9, 10 of the motor vehicle are further illustrated.

In addition, the drive train comprises a control unit 11, which is connected to the gearbox 1 via the control lines 12, 13, sensor line 14, the clutch 2 and an accelerator pedal 15. The course of the method according to the present invention represented in FIG. 2 by way of example takes place in this control unit 11, which is preferably configured as gearbox control device.

Figure 2:
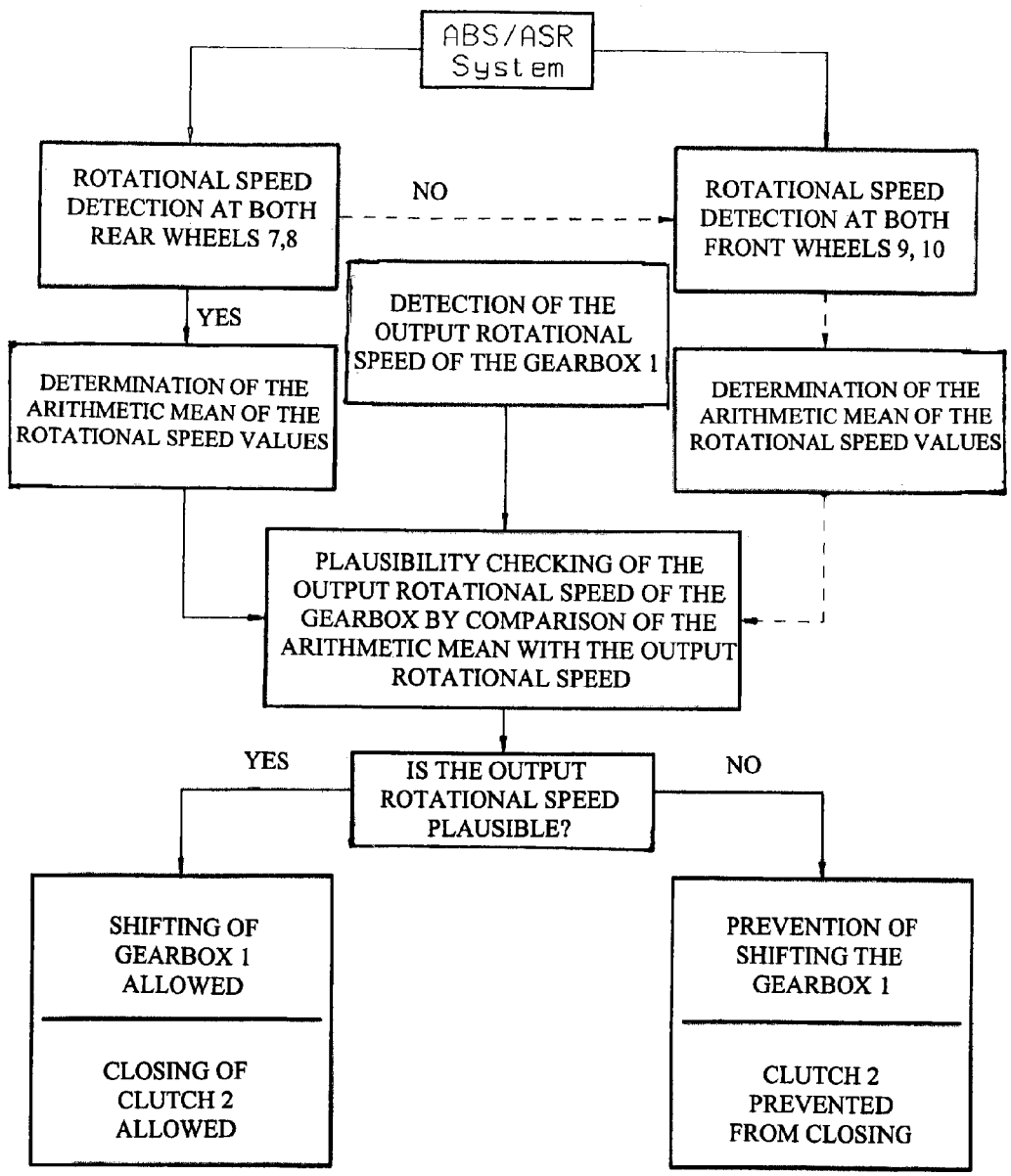
FIG. 2 shows a flow chart regarding plausibility checking of the detected gearbox output rotational speed according to FIG. 1

As already mentioned in the introduction, the output rotational speed detected by means of one or more rotational speed sensors 16, and/or the consequently generated output rotational speed signal 17, is especially important in the transmission ratio control of automated gearboxes 1. For this reason, the rotational speeds of the rear wheels 7, 8 are detected as rotational speed values 20 and/or 21 by means of respectively one or more wheel rotational speed sensors 18, 19. As illustrated in FIG. 2, these rotational speed values are also available to an anti-lock braking system ABS and/or an anti-skid regulating system ASR of the motor vehicle and are provided by a databus system known per se. The arithmetic mean value of the rear wheel rotational speeds is formed from these rotational speed values 20 and/or 21 of the rear wheels 7, 8 in the control unit 11.

Plausibility checking for correctness of the output rotational speed of the gearbox 1 measured by the sensor 16 is performed by software stored in the control unit 11 which compares the output rotational speed to the arithmetic mean value of the rotational speed of the rear wheels 7, 8 formed. If the detected rotational speed value of the gearbox output shaft is determined to be plausible, it can be used by the control unit 11 for controlling the transmission ratio. If this rotational speed value of the gearbox output shaft proves to be implausible, and thus false, this detection by the control unit 11, among other things, can prevent detrimental shifting of the gearbox 1 and/or undesirable engagement of the clutch 2.

In order to address the problem of a possible failure of at least one of the two signals 20, 21 of the rear wheel rotational speed sensors 18, 19 because they are lost or due to a failure in the signaling line and/or its electric contacts, and also in order to further ensure the drivability of the motor vehicle and/or its safe operation, in case of a failure of this type, according to the present invention, the arithmetic mean formed by the rotational speed values of the front wheels 9, 10 and thereby generated signals 24, 25 are detected by the wheel rotational speed sensors 22, 23 and the arithmetic mean is used for the plausibility of the output rotational speed of the gearbox 1 (FIGS. 1 and 2).

The need for determining the arithmetic mean value of the detected rotational speeds of the front wheels 9, 10 results from the circumstance that the front wheels 9, 10 are not form-locked to the output of the gearbox 1. This allows for differences between the rotational speeds of the front wheels 9, 10 and the output rotational speed of the gearbox 1, which are not intrinsically caused by a failure of the rotational speed sensors 16, 22, 23, but, for example, by the driven rear wheels 7, 8 spinning on a smooth surface.

Granted that significant differences between the arithmetic mean of the wheel rotational speeds of the front wheels 9, 10 and the output rotational speed of the gearbox 1 are detected, the control unit 11 will especially prevent detrimental shifting of the gearbox 1, if the output rotational speed of the gearbox 1 indicates that the motor vehicle is standing still, while it is moving. Such or other significant differences in the rotational speed values to be compared can, for example, be a deviation of the mean value of the wheel rotational speeds of the front wheels 9, 10 from the output rotational speed of the gearbox 1 amounting to between 5% to 10%.

By this measure, erroneous engagement of the first gear or another start-up gear, and consequently the destruction, or at least strong wear of the clutch 2 because of inadmissible high rotational speeds of the input shaft of the gearbox 1, are in particular advantageously prevented.

If no significant differences between the mean value of the rotational speeds of the front wheels 9, 10 and the output rotational speed of the gearbox 1 are detected instead, the aforementioned shifting of the gearbox 1 is allowed, and initiated by means of the control unit 11 via the corresponding activation of gearbox actuators.

It is likewise possible that significant differences, as defined above or otherwise, between the arithmetic mean value of the rotational speeds of the front wheels 9, 10 and the output rotational speed of the gearbox 1 are detected, if the output rotational speed of the gearbox 1 indicates a rotational speed of the motor vehicle, while it is actually standing still. In this concrete case, the clutch 2 is prevented from engaging when the accelerator pedal is in a position below a preset threshold. A corresponding reading-related threshold value of the accelerator pedal deflection can for example be in the range of 5% to 10% of the maximum travel distance of the accelerator pedal. This measure advantageously prevents an unintentional start-up of the motor vehicle as a result of a possible faulty detection of the vehicle motion associated with conventional engagement of the clutch 2 provided by control engineering for such operating conditions.

If instead no significant differences between the arithmetic mean value of the rotational speeds of the front wheels 9, 10 and the output rotational speed of the gearbox 1 are detected, so that the arithmetic mean value of the rotational speeds of the front wheels 9, 10 at least approximately matches the output rotational speed of the gearbox 1, engagement of the clutch 2 will be allowed if necessary.

With total guarantee of vehicle safety, the above-mentioned plausibility checking steps according to the present invention are not associated with any, or only very minor, restrictions to the drivability of the motor vehicle because conventional software only requires corresponding adjustments in the control unit 11.

With regard to the use of both rotational speed sensors 22, 23 of the front wheels 9, 10, they are basically already part of the available vehicle safety systems as well, for example the above mentioned ABS/ASR systems.

Incidentally, the above mentioned plausibility strategies can also be performed with the gearbox in neutral and the open clutch 2 disengaged. Furthermore, additional data, like for example the prime mover rotational speed and/or the gearbox input rotational speed are dispensable for this purpose because the above described method uses the rotational speeds of the front and rear wheels that are already available from the ABS and/or ASR systems.

The method according to the present invention finally offers the advantage that if the rotational speed data on the rear wheels is available, it is used for a very accurate plausibility check. Only if this rotational speed data on the rear wheels is not available, or is only available from one rotational speed sensor, the plausibility check is virtually performed in emergency operation using the rotational speed data on the front wheels, probably with slightly reduced accuracy.

REFERENCE NUMERALS

1 gearbox
2 clutch
3 prime mover
4 differential gear
5 axle shaft
6 axle shaft
7 rear wheel
8 rear wheel
9 front wheel
10 front wheel
11 control unit
12 control line to the gearbox
13 control line to the clutch
14 control line to the accelerator pedal sensor
15 accelerator pedal
16 rotational speed sensor (gearbox output rotational speed)
17 output rotational speed signal
18 rotational speed sensor at the rear wheel 7
19 rotational speed sensor at the rear wheel 8
20 signal from the wheel rotational speed sensor 18
21 signal from the wheel rotational speed sensor 19
22 rotational speed sensor at the front wheel 9
23 rotational speed sensor at the front wheel 10
24 signal from the wheel rotational speed sensor 22
25 signal from the wheel rotational speed sensor 23
26 cardan shaft

The invention claimed is:

1. A method of operating a motor vehicle with an automated gearbox (1) which is connectable, via a clutch (2), to a prime mover (3), and an output rotational speed of the gearbox (1) is detected by sensors and assessed for plausibility by comparison with an arithmetic mean value of sensor-detected rotational speeds of rear wheels (7, 8) of the motor vehicle, upon a failure of at least one of both generated signals (20, 21) of rotational speed sensors (18, 19) of the rear wheels (7, 8), the arithmetic mean of sensor-detected rotational speeds of front wheels (9, 10) is used for checking the plausibility of the output rotational speed of the gearbox (1), and upon detection of significant differences between the arithmetic mean value of the rotational speed sensors of the front wheels (9, 10) and the output rotational speed of the gearbox (1), at least one of:
preventing the gearbox (1) from shifting, if the output rotational speed of the gearbox (1) indicates that the motor vehicle is standing still, while the motor vehicle is moving, and
preventing the clutch (2) from engaging with a position of and accelerator pedal below a previously determined reading-related deflection threshold of a travel distance of the accelerator pedal, if the output rotational speed of the gearbox (1) indicates a rotational speed of the motor vehicle, while the motor vehicle is standing still.

2. A method of operating a motor vehicle with an automated gearbox (1) which is connectable, via a clutch to a prime mover (3), and an output rotational speed of the gearbox (1) is detected by sensors and assessed for plausibility by comparison with an arithmetic mean value of sensor-detected rotational speeds of rear wheels (7, 8) of the motor vehicle, upon a failure of at least one of both generated signals (20, 21) of rotational speed sensors (18, 19) of the rear wheels (7, 8), the arithmetic mean of sensor-detected rotational speeds of front wheels (9, 10) is used for checking the plausibility of the output rotational speed of the gearbox (1), and upon detection of significant differences between the arithmetic mean value of the rotational speed sensors of the front wheels (9, 10) and the output rotational speed of the gearbox (1), at least one of:
preventing the gearbox (1) from shifting, if the output rotational speed of the gearbox (1) indicates that the motor vehicle is standing still, while the motor vehicle is moving,
preventing the clutch (2) from engaging with a position of and accelerator pedal below a previously determined reading-related deflection threshold of a travel distance of the accelerator pedal, if the output rotational speed of the gearbox (1) indicates a rotational speed of the motor vehicle, while the motor vehicle is standing still; and
if the arithmetic mean value of the rotational speeds of the front wheels (9, 10) and the output rotational speed of the gearbox (1) agree without substantial differences, allowing shifting of the gearbox.

3. A method of operating a motor vehicle with an automated gearbox (1) which is connectable, via a clutch (2), to a prime mover (3), and an output rotational speed of the gearbox (1) is detected by sensors and assessed for plausibility by comparison with an arithmetic mean value of sensor-detected rotational speeds of rear wheels (7, 8) of the motor vehicle, upon a failure of at least one of both generated signals (20, 21) of rotational speed sensors (18, 19) of the rear wheels (7, 8), the arithmetic mean of sensor-detected rotational speeds of front wheels (9, 10) is used for checking the plausibility of the output rotational speed of the gearbox (1), and upon detection of significant differences between the arithmetic mean value of the rotational speed sensors of the front wheels (9, 10) and the output rotational speed of the gearbox (1), at least one of:
preventing the gearbox (1) from shifting, if the output rotational speed of the gearbox (1) indicates that the motor vehicle is standing still, while the motor vehicle is moving,
preventing the clutch (2) from engaging with a position of and accelerator pedal below a previously determined reading-related deflection threshold of a travel distance of the accelerator pedal, if the output rotational speed of the gearbox (1) indicates a rotational speed of the motor vehicle, while the motor vehicle is standing still; and if the arithmetic mean value of the rotational speeds of the front wheels (9, 10) and the output rotational speed of the gearbox (1) agree without substantial differences, allowing engagement of the clutch (2).

4. The method according to claim 1, further comprising the step of defining a rotational speed deviation of essentially between 5% and 10% as a substantial difference between the arithmetic mean of the rotational speeds of the front wheels (9, 10) and the output rotational speed of the gearbox (1).

5. The method according to claim 1, further comprising the step of defining the deflection threshold of a travel difference of the accelerator pedal (15) as being between 5% and 10% of a maximum travel distance of the accelerator pedal (15).

* * * * *